June 6, 1967 N. J. KODA 3,324,327

INFRARED CAMERA TUBE HAVING GRID-TYPE INFRARED-SENSITIVE TARGET

Filed April 23, 1965

INVENTOR.
NOBUO J. KODA,
BY
W. H. MacAllister Jr.
ATTORNEY

United States Patent Office 3,324,327

Patented June 6, 1967

3,324,327

INFRARED CAMERA TUBE HAVING GRID-TYPE INFRARED SENSITIVE TARGET

Nobuo J. Koda, Vista, Calif., assignor to Hughes Aircraft Company, Culver City, Calif., a corporation of Delaware Filed Apr. 23, 1965, Ser. No. 450,333
12 Claims. (Cl. 313—66)

ABSTRACT OF THE DISCLOSURE

An infrared camera tube having a grid type infrared-sensitive target in the form of and acting as a grid for modulating an electron beam passing therethrough to a signal collector electrode.

The present invention relates to the conversion of far infrared energy scenes into electrically transmittable information signals, especially at television scanning rates. More particularly, the invention relates to an infrared camera cathode ray tube in which infrared energy is converted by electron beam readout techniques into useful electrical signals.

The generation of electrical signals from thermal radiations is known and many devices are available for accomplishing such generation. Thus, for example, Garbuny et al. describe such a converter in an article entitled "Image Converter for Thermal Radiation" published in vol. 51 (No. 3) of the Journal of the Optical Society (March 1961, pages 261–273). The principal effort in this art in recent years has been to improve the sensitivity of these converters. There have been efforts to improve detectability by operating the converter tube at a low ambient temperature and by employing infrared sensitive target materials which have a high band gap but the gains realized by these approaches have not proven to be as great as is desired.

It is therefore an object of the present invention to provide an improved infrared imaging or pickup tube.

Another object of the invention is to provide an infrared imaging tube of improved sensitivity.

Still another object of the invention is to provide improved apparatus for converting thermal radiations into electrical signals.

These and other objects and advantages of the invention are realized by providing an infrared responsive target in a cathode ray tube which target has a low electrical capacitance thus resulting in an enhanced sensitivity to infrared energy and which also is capable of modulating relatively large electron beam currents which are not limited by elemental target capacitance charging. The enhanced IR sensitive target of the invention is also relatively easy to construct. The enhanced sensitivity is obtained by allowing a small part of the beam current to land on the modulating target surface whose surface potential controls the current to a collector electrode. The electron beam charges the dielectric target surface to zero or cathode potential so that with a positive voltage on the target mesh, most of the beam current is cut off from the signal collector electrode. Upon absorption of IR radiation, the dark current through the dielectric increases and the surface potential integrates to a more positive potential. The dielectric surface potential thus acts as a grid to modulate the electron beam to the signal collector electrode.

The invention will be described in greater detail by reference to the drawings in which.

Figure 1:
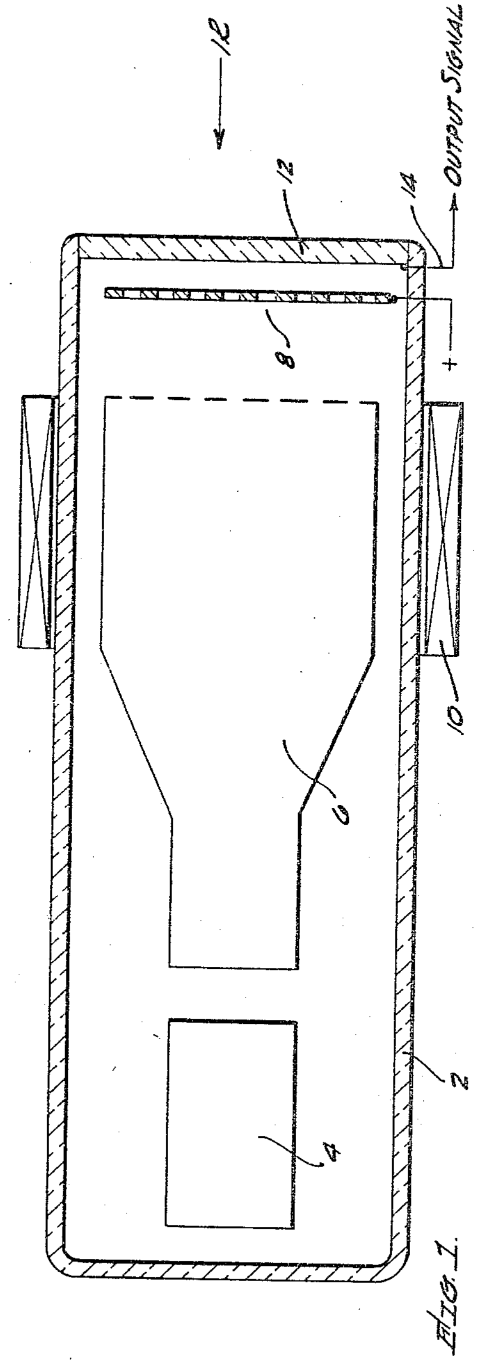
FIGURE 1 is an elevational view, partially schematic and partly sectional, of the infrared camera tube of the invention.

Referring now to the drawings and FIGURE 1 in particular, a cathode ray tube is shown comprising an evacuated glass envelope or container 2 in which is disposed an electron gun 4 for forming an electron beam of elemental cross-sectional area. Also contained within the envelope are beam focussing and collimating lens means 6 to permit the electron beam to be focussed and caused to approach the target member 8 at substantially right angles thereto. Disposed around the outside of the envelope 2 is an electromagnetic deflection system or coil 10 which causes the electron beam generated by the gun 4 to orthogonally scan the target member 8 in a predetermined fashion. The cathode ray tube structure described so far is well known and may be of the kind found in television pickup or camera tubes of the type known as a Vidicon which is amply described in the prior art. In such pickup tubes, as in the case of the tube of the present invention, the purpose is to derive an electrical output signal representative of and corresponding to the light or radiation directed onto the target member 8. This output signal may then be transmitted or otherwise applied to a conventional cathode ray tube so as to form a visual image corresponding to the scene viewed by the camera or pickup tube. The tube of the present invention is specifically directed to providing such an output signal in response to radiations impinging on the target member 8 which radiations are in the infrared frequency spectrum and particularly to infrared radiations in the wavelength region of 10 microns since this region represents infrared "window" in the atmosphere.

To permit such infrared radiations to impinge upon the target member 8, whose structure will be described in greater detail hereinafter, the faceplate end of the envelope 2 is provided with an infrared transmissive window 12 which also serves as an electrical signal collector electrode in a manner to be described more fully. I have found that a suitable window for this purpose may be formed of germanium. The IR transmissive window and signal collector 12 may be fused or otherwise hermetically sealed to the end of the envelope 2 which may itself be glass. An electrical lead 14 is ohmically connected to the window-signal collector 12 and brought outside the envelope 2 in any convenient and well-known manner.

Figure 2:
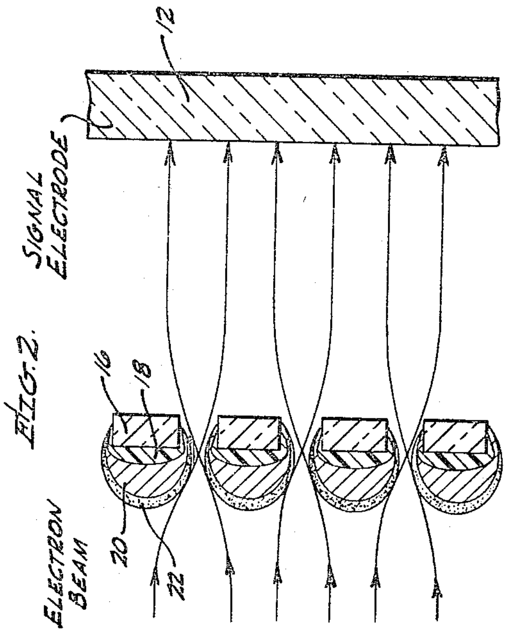
FIGURE 2 is an elevational view in section of a detailed portion of the target and collector electrode members of the tube shown in FIGURE 1.

With particular reference to FIGURE 2, the IR sensitive target member 8 comprises an infrared transparent, electrically conductive germanium mesh support member 16 which may be formed by etching a thin wafer of germanium which is exposed to the action of the etchant through an etch-resistant mask in the pattern of the mesh to be formed. The mask may be of photo-resist material, for example, which is formed by exposure thereof to a light pattern corresponding to the pattern of the desired mesh to be formed. The semiconductor mesh support may be about one mil in thickness, for example. Etching solutions for germanium are well known in the semiconductor art and it is not deemed necessary to give a detailed description thereof herein except to suggest that a suitable etchant for germanium is a mixture of hydrochloric and nitric acids. An electroformed germanium mesh can also be fabricated by plating germanium in a bath of 5.9 ml. of germanium tetrachloride and 78.5 ml. of propylene glycol using a carbon anode, for example.

Next a layer 18 of thermally insulating material about ten microns thick, for example, is disposed over one side of the semiconductor support mesh 16 and deposited as a low density (porous) coating. A suitable material for this purpose may be antimony sulfide, for example. A layer 20 of material capable of absorbing infrared energy is next disposed over the heat-insulating layer 18. Since it will be understood that the absorption of infrared energy results in a temperature rise in the absorber, the purpose of the heat-insulating layer 18 is to inhibit or reduce the action of the semiconductor support member 16 from acting as a heat sink for the heat generated in the absorber layer 20. A typically satisfactory IR absorber material may be a barely opaque layer of deposited gold, for example.

Deposited over the IR absorber layer 20 is layer 22 of temperature sensitive dielectric material, about one-quarter to one mil thick, for example. A suitable dielectric material for this purpose may be arsenic triselenide deposited as a low density layer to achieve low capacitance. The completed target should have a transconductance $g_m$ of about one micromho in order to provide high sensitivity.

The IR target structure 8 just described is mounted in the envelope 2 so that the temperature sensitive dielectric layer 22 is faced toward the electron gun 4 and is arranged so as to be orthogonally scanned thereby.

In operation, the dielectric layer 22 is scanned by the electron beam from the electron gun until the potential of the dielectric surface is charged to zero or to the potential of the electron gun cathode. A potential which may be from about five to fifty volts positive with respect to the cathode of the electron gun 4 is maintained on the conductive semiconductor support mesh 16. Under these conditions, most of the electron beam from the electron gun 4 is cut off from penetrating through the target member 8 and reaching the signal electrode 12.

When the tube 2 is aimed at or exposed to IR radiation, the IR energy penetrates through the IR transparent signal collector "window" 12 as well as through the IR transparent mesh support member 16 and the thermal insulator layer 18 and is absorbed in the absorber layer 20. At the areas of the absorber layer 20 where the IR radiation is absorbed, heat is generated which affects corresponding areas of the temperature sensitive layer 22 so that the current therethrough increases and the potential of corresponding surface areas integrates to a more positive voltage, thus permitting the scanning electron beam to penetrate through the target 8 and be collected by the signal collecting window electrode member 12. The dielectric surface potential thus acts as a grid to modulate the electron beam to the signal electrode 12 in accordance with the intensity of the IR radiation received and in this way output signals are derived representative of the IR radiation pattern received.

With a tube having a target such as just described it has been calculated that the minimum object temperature difference which may be detected with a target having a $g_m$ of about one micromho is better than a factor of ten over the theoretical sensitivity of prior tubes such as described in U.S. Patent No. 3,123,737 to R. J. Schneeberger.

Figure 3:
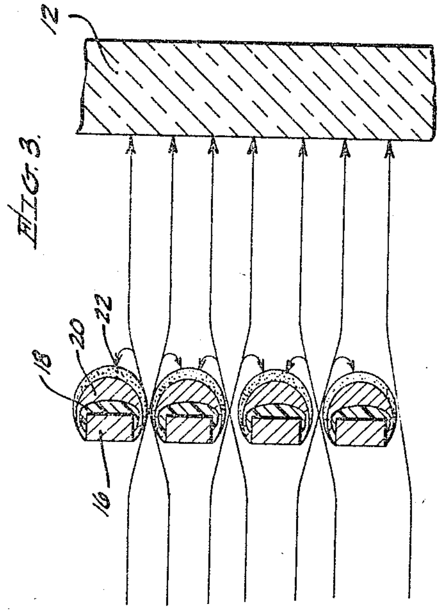
FIGURE 3 is an elevational view in section of a detailed portion of the target and collector electrode members according to another embodiment thereof for use in the tube shown in FIGURE 1.

In FIGURE 3, an alternate embodiment of the IR target is shown which eliminates the germanium support which may be difficult to form especially to provide a large number of mesh openings. The support mesh member 16 in FIGURE 3 comprises an electroformed nickel screen which may be fabricated to have from 300 to 500 or more meshes per inch. The thermal insulator material is deposited in the form of a layer 18 on one side of the nickel mesh 16 as before over which a layer 20 of IR absorber material is deposited, again as before. The temperature sensitive dielectric layer 22 is then deposited over the IR absorber layer 20. The IR target assembly 8 is then disposed in the envelope 2 so that the nickel mesh screen 16 faces the electron gun 4 and the IR sensitive layer 22 faces the IR transparent signal collecting electrode. This reversal is necessary since the nickel screen 16 is not sufficiently transparent to IR radiation to permit its penetration to the IR absorber layer 20 while the temperature sensitive layer 22 is sufficiently transparent to IR radiation for this purpose. Operation of the tube having the target structure of FIGURE 3 is the same as described in connection with the operation of the target assembly shown in FIGURE 2.

By the target construction of the present invention, sensitivity is improved because a small part of beam current is allowed to land on the modulating target surface and the surface potential which controls the current to a collector. The dielectric surface potential thus acts as a grid to modulate the beam transmitted to the signal electrode. The construction of the target is such that with positive voltage on the target mesh, and the dielectric surface at zero, most of the beam is cut off from the signal electrode. When the IR radiation is absorbed by the underlayer, the dark current through the dielectric increases and the surface potential integrates to a more positive voltage during one frame time. Incidentally, storage with integration over a number of frames during continuous scanning is possible by merely choosing proper D.C. potentials on the target mesh and signal electrode.

The advantage of this type of modulation over the simple capacitance charging is that the smaller target capacitance and higher voltage modulation are used with a consequent increase in signal current. In prior art type targets, increased signal current is obtained with increased target capacitance, and this increase is limited by lag effects or by the nature of the dielectric absorber construction.

An estimate of sensitivity of a tube using the target of the present invention is given below. The signal current under steady state condition can be written as $$i_s = g_m V \tag{1}$$

where $g_m$=transconductance of the beam
$V$=semiconductor surface potential from zero.

For optimum performance, $t$=RC, so that $$\frac{\partial V}{\partial T} = \frac{\epsilon \phi V_0}{2eKT^2} \tag{2}$$

where $\epsilon$=electron charge
$\phi$=energy gap in volts
$e$=exponential
$T$=absolute temperature
$K$=Boltzmann constant
$V_0$=backplate potential The signal current of interest is the current under dynamic condition $$\Delta i_s = g_m \frac{\partial V}{\partial T} \Delta T \tag{3}$$

where $\Delta T$=incremental change in target temperature and $\Delta i_s$ is limited by shot noise and therefore is given by $$\sqrt{2\epsilon \bar{i}(\Delta f)}$$

where $\bar{i}$=beam current
$\Delta f$= bandwidth

Then, substituting into (3) from Equation 2 and utilizing the shot noise relation above in solving for ΔT, we get $$\Delta T = \sqrt{\frac{2\bar{i}\Delta f}{\epsilon}} \left( \frac{2eKT^2}{g_m \phi V_0} \right) \tag{4}$$

Assuming for $g_m$ a value of one micromho (which appears reasonable), we obtain:

$$\Delta T_{\text{retin}} = \left( \sqrt{\frac{2 \times 10^{-7} \times 10^{+6}}{1.6 \times 10^{-19}}} \right) \left( \frac{2 \times 2.72 \times 1.4 \times 10^{-23} \times 9 \times 10^{4}}{10^{-6} \times 2.2 \times 20} \right)$$

$$= 1.7 \times 10^{-4} \text{ degrees}$$

Since the image temperature distribution on the retina can be shown to be about 1% of that in the object space (see Garbuny et al., supra):

$\Delta T_{\text{object}} \approx \Delta T_{\text{retina}} \times 100 = 0.02$ degree object temperature difference.

It will thus be understood that the principles involved in the device of the present invention are similar to those of the Vidicon tube to the extent that the charge pattern at the target is read off with an electron beam. In the present invention, the incoming IR radiation is used to change the dark current level in the target element by changing its elemental temperature and this change in elemental dark current is detected as surface charge difference to be read out by the electron beam. As mentioned previously, integration during one or more TV frames is thus possible for enhanced sensitivity or *storage* capability.

There thus has been described a novel target construction for infrared imaging tubes in which the detection capability is increased by an order of magnitude. By the invention, an increase in the $g_m$ of the target is utilized so that, unlike the elemental capacitance discharge method of readout used in the former Vidicon-like operation, the novel target construction of the invention utilizes target modulation to control the amount of transmitted beam current through an aperture. With $g_m$ of one micromho, enhanced sensitivity is achieved.

What is claimed is:

1. A pickup tube for converting infrared radiations into electrical output signals comprising:

A. an evacuated envelope having an electrically conductive infrared transparent window portion;

B. an electron gun disposed in said envelope and adapted to generate an electron beam of elemental cross-sectional area;

C. and an electron penetrable target electrode means for modulating electrons passing therethrough disposed in said envelope between said window portion thereof and said electron gun comprising:

(1) an electrically conductive mesh support member;

(2) a layer of thermally insulating material disposed on one side of the meshes of said support member;

(3) a layer of infrared radiation absorber material disposed on said layer of thermally insulating material;

(4) and a layer of temperature sensitive material disposed on said layer of absorber material.

2. The invention according to claim 1 wherein said window portion is formed of electrically conductive, infrared transparent semiconductor material.

3. The invention according to claim 1 wherein said window portion is formed of germanium.

4. The invention according to claim 1 wherein said mesh support member is formed of electrically conductive, infrared transparent semiconductor material.

5. The invention according to claim 1 wherein said mesh support member is formed of germanium.

6. The invention according to claim 1 including means for making electrical connections to said window portion and to said mesh support member.

7. A pickup tube for converting infrared radiations into electrical output signals comprising:

A. an evacuated envelope having an electrically conductive germanium window portion;

B. an electron gun disposed in said envelope and adapted to generate an electron beam of elemental cross-sectional area;

C. and an electron penetrable target electrode means for modulating electrons passing therethrough disposed in said envelope between said germanium window portion and said electron gun comprising:

(1) an electrically conductive germanium mesh support member;

(2) a layer of thermally insulating material deposited on one side of the meshes of said germanium support member;

(3) a layer of infrared radiation absorber material deposited on said layer of thermally insulating material;

(4) and a layer of temperature sensitive material deposited on said layer of absorber material.

8. The invention according to claim 7 wherein said target electrode member is disposed in said envelope so that the side of the meshes of said germanium support member faces said germanium window portion.

9. The invention according to claim 7 including means for making electrical connections to said germanium window portion and to said germanium support member.

10. A pickup tube for converting infrared radiations into electrical output signals comprising:

A. an evacuated envelope having an electrically conductive germanium window portion;

B. an electron gun disposed in said envelope and adapted to generate an electron beam of elemental cross-sectional area;

C. and an electron penetrable target electrode means for modulating electrons passing therethrough disposed in said envelope between said germanium window portion and said electron gun comprising:

(1) a metallic mesh support member;

(2) a layer of thermally insulating material deposited on one side of the meshes of said support member facing said window portion;

(3) a layer of infrared radiation absorber material deposited on said layer of thermally insulating material;

(4) and a layer of temperature sensitive material deposited on said layer of absorber material.

11. The invention according to claim 10 wherein said metallic mesh support member is formed of nickel.

12. The invention according to claim 10 including means for applying electrical potentials to said mesh support member and means for deriving electrical signals from said germanium window portion.

References Cited

UNITED STATES PATENTS

| | | | |
|---|---|---|---|
| 2,879,424 | 3/1959 | Garbuny et al. | 313—100 |
| 3,034,010 | 5/1962 | Garbuny | 313—65 X |
| 3,082,340 | 3/1963 | Schneeberger | 313—65 |
| 3,109,097 | 10/1963 | De Waard et al. | 250—83.3 |
| 3,123,737 | 3/1964 | Schneeberger | 313—101 X |

JAMES W. LAWRENCE, *Primary Examiner.*

ROBERT SEGAL, *Examiner.*